(12) United States Patent
Foret

(10) Patent No.: US 11,717,891 B2
(45) Date of Patent: Aug. 8, 2023

(54) METHOD FOR PRODUCING A METAL WORKPIECE IN LAYERS BY MEANS OF LASER-ASSISTED ADDITIVE MANUFACTURING

(71) Applicant: Messer Industries USA, Inc., Bridgewater, NJ (US)

(72) Inventor: Pierre Foret, Munich (DE)

(73) Assignee: Messer Industries USA, Inc., Wilmington, DE (US)

(*) Notice: Subject to any disclaimer, the term of this patent is extended or adjusted under 35 U.S.C. 154(b) by 356 days.

(21) Appl. No.: 15/560,262

(22) PCT Filed: Mar. 23, 2016

(86) PCT No.: PCT/EP2016/000502
§ 371 (c)(1),
(2) Date: Sep. 21, 2017

(87) PCT Pub. No.: WO2016/155871
PCT Pub. Date: Oct. 6, 2016

(65) Prior Publication Data
US 2018/0065209 A1   Mar. 8, 2018

(30) Foreign Application Priority Data

Mar. 31, 2015   (EP) .................................. 15000936

(51) Int. Cl.
*B22F 10/28*   (2021.01)
*B22F 10/32*   (2021.01)
(Continued)

(52) U.S. Cl.
CPC .............. *B22F 10/28* (2021.01); *B22F 10/32* (2021.01); *B23K 26/125* (2013.01);
(Continued)

(58) Field of Classification Search
CPC ............ B22F 3/1055; B22F 2003/1057; B22F 3/003; B22F 3/1007; B22F 2003/1056;
(Continued)

(56) References Cited

U.S. PATENT DOCUMENTS

2013/0193620 A1   8/2013   Mironets
2014/0140882 A1*  5/2014   Syassen ................ B29C 64/153
                                                419/53
(Continued)

FOREIGN PATENT DOCUMENTS

EP   2 774 703 A1    9/2014
EP      2774703 A1 *  9/2014  ........... B29C 64/364

OTHER PUBLICATIONS

International Search Report for PCT/EP2016/000502, dated Jun. 2, 2016, Authorized Officer: Gilles Forestier, 4 pages.

*Primary Examiner* — Tu B Hoang
*Assistant Examiner* — Vy T Nguyen
(74) *Attorney, Agent, or Firm* — Joshua L. Cohen

(57) ABSTRACT

There is provided a method for producing a metallic workpiece in layers by additive manufacturing, metallurgical layers of the workpiece being produced by providing a metal material in a manufacturing chamber for each metallurgical layer and applying a laser beam to the metal material, and providing a gas atmosphere in the manufacturing chamber during the application of the laser beam to the layers of the metal material, wherein a part of the gas atmosphere is drawn off from the manufacturing chamber as a gas stream, at least one parameter of the gas stream and/or the gas atmosphere being determined and being compared with a desired value. Depending on the comparison of the parameter with the desired value, the gas stream is fed back to the manufacturing chamber and a process gas is supplied to the manufacturing chamber.

12 Claims, 1 Drawing Sheet

(51) Int. Cl.
*B33Y 10/00* (2015.01)
*B33Y 40/00* (2020.01)
*B33Y 50/02* (2015.01)
*B23K 26/342* (2014.01)
*B23K 26/12* (2014.01)

(52) U.S. Cl.
CPC ............ *B23K 26/342* (2015.10); *B33Y 10/00* (2014.12); *B33Y 40/00* (2014.12); *B33Y 50/02* (2014.12); *Y02P 10/25* (2015.11)

(58) Field of Classification Search
CPC ......... B33Y 10/00; B33Y 30/00; B33Y 70/00; B33Y 40/00; B33Y 50/02; B23K 15/0086; B23K 26/20; B23K 26/125; B23K 26/342
USPC ......... 219/219, 121.64, 76.12; 264/264, 401, 264/497, 460; 425/425, 78, 174.4
See application file for complete search history.

(56) References Cited

U.S. PATENT DOCUMENTS

2016/0045981 A1* 2/2016 Zurecki ................. B33Y 10/00
219/76.12
2017/0304945 A1* 10/2017 Sutcliffe ................ B33Y 50/02

* cited by examiner

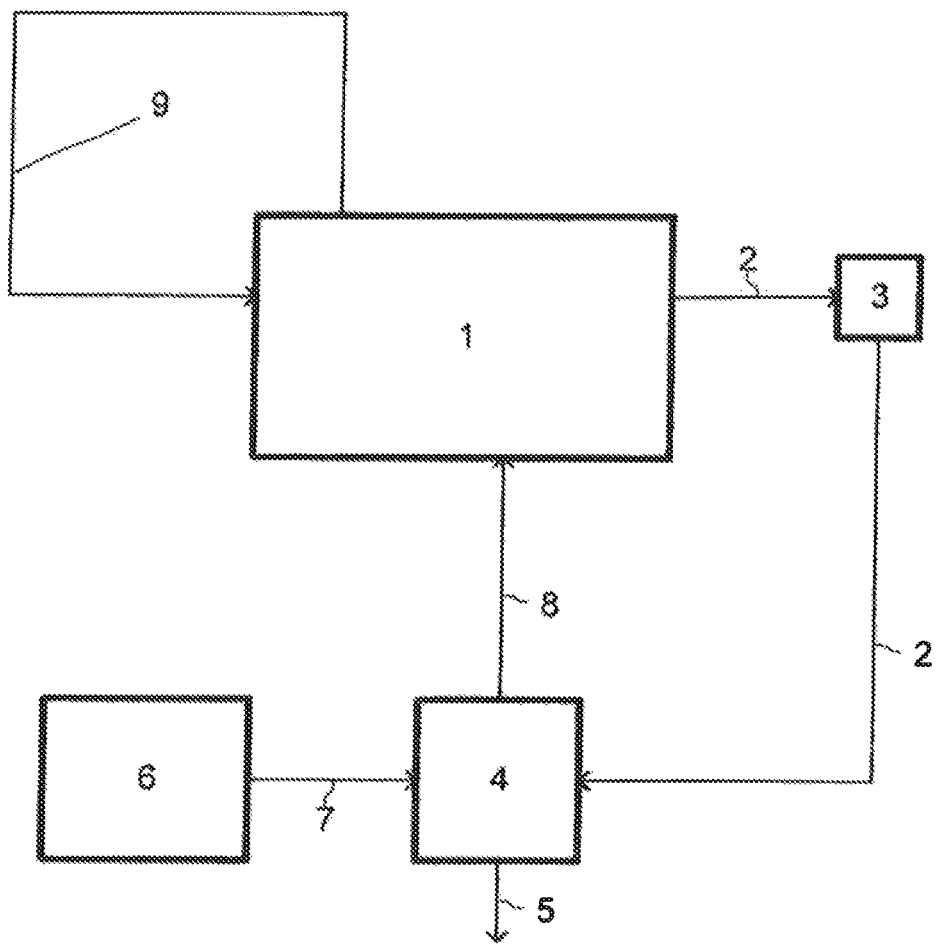

METHOD FOR PRODUCING A METAL WORKPIECE IN LAYERS BY MEANS OF LASER-ASSISTED ADDITIVE MANUFACTURING

BACKGROUND OF THE INVENTION

The invention pertains to a method for producing a metallic workpiece in layers by means of laser-assisted additive manufacturing, particularly by means of laser melting in a manufacturing chamber.

In generative or additive manufacturing processes, a three-dimensional object or workpiece can be produced in layers of a metallic material. The finished workpiece is composed of different metallurgical layers, which are individually produced in succession during the course of the additive manufacturing process. The metallic material for each of these metallurgical layers of the workpiece may be applied, for example, in the form of a powder and solidified. For this purpose, the applied material may be acted upon, for example, with a laser beam and/or electron beam. In this way, the material can be subjected to a sintering or melting process such that the material is solidified. Once a metallurgical layer has been completed, the next layer can be produced analogously.

Depending on the respective field or application, additive manufacturing processes are also referred to as rapid prototyping. For example, tools, workpieces or components for different purposes can be produced during the course of a rapid prototyping process. Additive manufacturing processes can be used in various fields such as, for example, in architecture, in machine construction, in aerospace, in medical engineering or in the automobile industry.

One known additive manufacturing process is the so-called laser melting process (laser melting or laser sintering, LS). A carrier plate, on which a workpiece to be produced is manufactured layer by layer, is usually arranged in a manufacturing chamber in this case. The entire manufacturing process takes place in this manufacturing chamber. Laser melting processes are therefore also referred to as chamber technique.

The manufacturing chamber is usually self-contained. A gas atmosphere with a certain composition can be introduced into the manufacturing chamber. The metallic material can be influenced depending on the chosen composition of the gas atmosphere in the manufacturing chamber.

If inert gases are chosen for the gas atmosphere, no reaction with the metallic material takes place. However, reactive gases that can react with the metallic material may also be used for the gas atmosphere. Consequently, metallurgical properties of the workpiece can be altered by choosing the gas atmosphere accordingly.

One frequently arising problem in additive manufacturing processes of the described type is the formation of pores in the workpiece.

It would therefore be desirable to enhance a corresponding method in such a way that a workpiece without pores can be produced.

SUMMARY OF THE INVENTION

This objective is attained with a method for producing a workpiece in layers by means of laser-assisted additive manufacturing, particularly laser melting, with the characteristics of claim 1. Advantageous embodiments form the objects of the respective dependent claims, as well as the following description.

BRIEF DESCRIPTION OF THE DRAWING

The embodiments of the present invention are elucidated below with reference to the attached schematic drawing, of which the FIGURE shows a manufacturing chamber for which the inventive method is employed.

DETAILED DESCRIPTION OF THE INVENTION

The laser melting process is carried out in a manufacturing chamber. The finished workpiece is composed of different metallurgical layers that are individually produced in succession. The individual metallurgical layers of the workpiece are respectively produced in that a metallic material is respectively provided for each metallurgical layer and acted upon with a laser beam. This takes place under a gas atmosphere in the manufacturing chamber.

The inventive method is therefore based on a known method, in which the metallurgical layers of the workpiece are produced by respectively providing a metallic material for each metallurgical layer in a manufacturing chamber and acting upon the respective metallic material with a laser beam, wherein a gas atmosphere is provided in the manufacturing chamber while acting upon the layers of metallic material.

The individual metallurgical layers particularly have a thickness in the range between 20 µm and 100 µm. The metallic material may be applied, for example, in the form of a powder or in the form of a rod or a strip. The workpiece to be produced is preferably arranged on a carrier plate. Once a metallurgical layer has been completed, the carrier plate is lowered, in particular, by the thickness of the completed layer and the next layer is then produced analogously. The carrier plate is particularly arranged in the manufacturing chamber.

For example, the laser beam may be introduced into the manufacturing chamber from outside or a corresponding laser head may be arranged in the manufacturing chamber. The laser beam particularly may be controlled by a control unit. For example, data such as CAD data characterizing the workpiece to be produced may be stored in this control unit. The control unit can activate and displace the laser beam over the carrier plate based on this data.

It was determined that some products manufactured with known methods of this type contain pores in their interior. In tests that preceded the present invention, it was determined that the reason for these pores is the inclusion of oxygen in or between the metallurgical layers. The inventors essentially have identified two sources of this undesirable oxygen: oxygen on the one hand infiltrates the manufacturing chamber through leaks and the metallic material, of which the workpiece is produced, may on the other hand contain oxides that release oxygen.

It was also determined that the water vapor content in the gas atmosphere increases over time. This increased water vapor content can also be attributed to undesirable oxygen.

The invention therefore proposes that part of the gas atmosphere is extracted from the manufacturing chamber in the form of a gas stream. One or more parameters of the gas stream and/or the gas atmosphere are determined and respectively compared with a nominal value. For example, the water vapor content of the gas stream or the water vapor content of the gas atmosphere in the manufacturing chamber may be determined and compared with a predefined nominal value.

The gas stream is either completely, partially or not at all returned into the manufacturing chamber in dependence on the result of the comparison of the parameter with the nominal value. Vice versa, a process gas is fed to the manufacturing chamber in dependence on the result of the comparison of the parameter with the nominal value. In the above-described example, part of the gas stream is no longer returned into the manufacturing chamber, but rather discarded or fed to a system in order to be used otherwise, if the measured water vapor content deviates from the nominal value, for example at an excessively high water vapor content. A process gas such as an inert argon stream is introduced into the manufacturing chamber instead of the discarded gas stream. According to the invention, the amount of process gas introduced corresponds to the amount. required for keeping the pressure in the process chamber constant. In this way, stable conditions are maintained in the process chamber.

It is preferred to determine one or more of the following parameters of the gas stream extracted from the manufacturing chamber: water vapor content, oxygen content, carbon content or temperature. Alternatively or additionally, one or more of the following parameters of the gas atmosphere in the manufacturing chamber are determined: water vapor content, oxygen content, carbon content or temperature.

A gas composition of a gas atmosphere in the manufacturing chamber can be respectively used for one or more metallurgical layers of the workpiece. However, the gas composition can also be changed after one or more metallurgical layers have been produced. The metallurgical properties of the respective metallurgical layers of the workpiece are also altered by the respective gas composition of the gas atmosphere in the manufacturing chamber. The gas composition for the metallurgical layers preferably is respectively chosen in such a way that the metallurgical properties of respectively adjacent metallurgical layers of the workpiece change in accordance with predefined criteria.

To this end, different nominal values are predefined for different process phases. This means that a first nominal value is chosen for a certain number of successive metallurgical layers and another nominal value is chosen for certain other metallurgical layers. For example, the permissible oxygen content in the gas atmosphere is for a few metallurgical layers higher than for metallurgical layers.

The gas composition is respectively chosen, in particular, such that the metallurgical properties of respectively adjacent metallurgical layers of the workpiece do not change abruptly, but rather continuously or gradually, and that no "jumps" or no sudden changes in the metallurgical properties of respectively adjacent metallurgical layers occur.

According to the invention, a parameter of the gas atmosphere or of the gas stream extracted from the manufacturing chamber is determined, measured or otherwise ascertained. The determination of the parameter may take place within the manufacturing chamber or outside the manufacturing chamber, for example in a line or a container, through which or into which the gas stream flows.

Different gas compositions may adjust in different regions of the manufacturing chamber. This may be caused, for example, by the undefined admission of foreign gas into the process chamber together with the material being introduced into the process chamber. This particularly applies if the material is supplied in the form of a powder. Due to the nonexistent or only very weak gas flow in the manufacturing chamber, the foreign gas is not uniformly distributed therein, but rather remains in certain regions. It is therefore advantageous to extract a part of the gas atmosphere, which is located at the same height as the material being acted upon by the laser beam, from the manufacturing chamber. When this extracted gas is subsequently analyzed, i.e. once a certain parameter of this gas stream has been determined, it is possible to draw direct conclusions regarding the gas atmosphere at the processing site.

The gas stream is entirely, partially or not at all returned into the manufacturing chamber depending on the result of the comparison between the measured parameter and the nominal value. In addition, a process gas is introduced or not introduced into the manufacturing chamber in dependence on the result of the comparison. The process gas may consist of a pure gas or a gas mixture in this case. The amount, pressure, temperature, composition and/or flow speed or even other variables that characterize the process gas can be varied in dependence on the result of the comparison between the measured parameter and the nominal value.

An isotropic, homogenous gas atmosphere with the respective gas composition is present, in particular, in the entire manufacturing chamber during the course of the production of each metallurgical layer. This respectively isotropic gas atmosphere makes it possible to correspondingly alter the metallurgical properties of the respective complete metallurgical layer in a simple and cost-effective fashion and with minimal effort. It is therefore not required to purposefully supply certain gases to certain regions of the melting material.

It is preferred to respectively choose the gas composition for each or multiple metallurgical layers in such a way that the metallurgical properties of the respective metallurgical layer(s) are respectively adjusted to predefined values. Consequently, the metallurgical properties of each metallurgical layer are purposefully influenced by the chosen gas composition. In this way, the metallurgical properties of adjacent metallurgical layers can be respectively adjusted or adapted to one another in a particularly simple fashion. The adjusted value of a metallurgical property of a particular metallurgical layer respectively depends, in particular, on the adjusted value of this metallurgical property of the respectively adjacent metallurgical layer.

It is preferred to respectively choose the gas composition for each or multiple metallurgical layer(s) in such a way that the values of the metallurgical properties of respectively adjacent metallurgical layers deviate from one another by no more than a predefined threshold value. This threshold value is particularly chosen such that no metallurgical notch is created between the respectively adjacent metallurgical layers. This threshold value preferably amounts to 5%, particularly 2.5%, especially 1%, of one or more metallurgical properties (suitable metallurgical properties in this respect are discussed below).

The appropriate choice of the threshold value particularly makes it possible to ensure a soft, fluent transition between the metallurgical properties of respectively adjacent metallurgical layers. An appropriate choice of the threshold value furthermore ensures that the change of the metallurgical properties follows the corresponding gradient, profile or distribution along the direction of propagation or longitudinal extension of the workpiece.

The inventive method not only can be used for maintaining a desired gas atmosphere in the manufacturing chamber, but also for causing certain changes, particularly slight chances, of the gas atmosphere. To this end, the nominal value for the comparison with the measured parameter of the gas stream or the gas atmosphere is changed accordingly. If the certain parameter deviates from the nominal value, the gas stream extracted from the manufacturing chamber is discarded and a process gas with the desired composition is introduced into the manufacturing chamber. In this case, it is particularly not required to completely remove the gas atmosphere currently present in the manufacturing chamber from the manufacturing chamber prior to the production of a new metallurgical layer. Since the gas atmosphere is continuously recirculated anyway and controlled by measuring one or more parameters, the extracted gas stream can be discharged and replaced with a process gas with the desired composition until the deviation between the measured parameter and the nominal value drops below a predefined threshold.

It is particularly advantageous to utilize the invention for adjusting and controlling a certain oxygen concentration in the manufacturing chamber. The invention particularly makes it possible to maintain the oxygen content of the gas atmosphere at a constant predefined value. This predefined value advantageously lies between 50 Vppm and 1000 Vppm, for example at 100 Vppm, 250 Vppm, 500 Vppm or 800 Vppm.

The invention not only makes it possible to monitor the gas atmosphere with respect to the compliance with certain threshold values, but also allows an active control of the gas atmosphere in accordance with the preferences and specifications of the user.

The metallurgical properties of the respective metallurgical layers of the workpiece, which are altered due to the respective gas composition of the gas atmosphere in the manufacturing chamber, preferably are a creep resistance, a hardness, a rigidity, a thermal conductivity, an electrical conductivity, a melting point, a corrosion resistance, an abrasion or wear resistance, a ductility, electromagnetic properties and/or a porosity.

It is preferred to produce the workpiece of a low-melting metal. For this purpose, the low-melting metal is respectively provided as metallic material for each metallurgical layer. In this context, low-melting metals are considered to be metals with a melting point of no more than 1500° C. preferably no more than 1200° C. particularly no more than 1000° C. and at least 500° C. For example, aluminum, tin, lead, zinc and/or silver or corresponding mixtures or alloys are used as low-melting metals. Corresponding alloys can also be produced of different metallic materials by introducing different component mixtures.

It is furthermore preferred that the workpiece is not produced of a refractory metal or a high-melting metal. Accordingly, no refractory metal or no high-melting metal is preferably used as metallic material. Refractory metal or high-melting metals particularly have a melting point of at least 1500° C. At such high temperatures, gases behave differently than at comparatively lower temperatures, particularly temperatures below 1500° C. The properties of gases, as well as occurring reactions, significantly differ at such high and such low temperatures. Different laws of thermodynamics particularly apply at these high temperatures and low temperatures. At high temperatures, in particular, it is much more elaborate to realize special metallurgical properties of the metallurgical layers than at lower temperatures. However, refractory metals or other components can also be embedded into a matrix of low-melting metals, for example, in order to create composite materials for producing particularly wear-resistant workpieces.

All in all, the workpiece therefore preferably comprises a low-melting metal and the laser melting process is preferably carried out at low temperatures of no more than 1500° C., particularly no more than 1200° C., especially no more than 1000° C. At such low temperatures, the workpiece can be easily and cost-effectively produced with minimal effort.

The gas atmosphere in the manufacturing chamber may consist of an inert gas, for example of argon. If the inert gas atmosphere should be maintained over the entire course of the manufacturing process, for example, the oxygen content or the water vapor content of the gas atmosphere or of the extracted gas stream is determined and the gas stream is no longer or no longer completely returned into the manufacturing chamber, but rather (partially) replaced with a process gas stream consisting of argon, if a certain nominal value for the oxygen content or the water vapor content is exceeded.

In another embodiment, a gas composition of a pure reactive gas or of a gas mixture with at least one reactive gas as gas component is respectively used as gas atmosphere for the metallurgical layers. The gas mixture used particularly comprises only gas components in the form of different reactive gases. The desired metallurgical properties of the respective metallurgical layer are particularly realized due to the concentration of the individual reactive gases in the gas atmosphere. In this case, a process gas, which likewise comprises one or more of the following reactive gases, is preferably fed to the gas atmosphere: hydrogen, oxygen, nitrogen, helium, carbon monoxide, carbon dioxide and/or hydrocarbons. The process gas may furthermore be a gas mixture consisting of an inert gas and a reactive gas.

For example, the use of nitrogen in the gas composition and the controlled supply of nitrogen as process gas make it possible to alter metallurgical properties in the form of the creep resistance, the hardness and/or the rigidity or the respective metallurgical layers of the workpiece. Nitrogen particularly produces nitrides, which lead to increased. creep resistance, hardness and/or rigidity, in the respective metallurgical layers.

The use of carbon dioxide in the gas composition for the gas atmosphere and the controlled supply of carbon dioxide as process gas make it possible, for example, to produce carbides in the respective metallurgical layers. Metallurgical properties in the form of the hardness and/or the abrasion or wear resistance of the metallurgical layers of the workpiece can be altered by using carbon dioxide in the gas composition.

The use of oxygen in the gas composition and the controlled supply of oxygen as process gas make it possible to produce oxides, particularly metal oxides, in the respective metallurgical layers. Metallurgical properties, in particular, in the form of the ductility or malleability and the deformability of the respective metallurgical layers of the workpiece can thereby be altered.

For example, the use of hydrogen in the gas composition and the controlled supply of hydrogen as process gas make it possible to produce bridle, fragile layers of the workpiece. In this way, predetermined breaking points can be realized in the workpiece.

The gas composition used for the gas atmosphere advantageously contains less oxygen than air under normal conditions. The oxygen content of the gas composition preferably lies between 0.01% and 21%. Such a gas composition makes it possible to use different components of the manufacturing chamber (e.g. valves, seals, hoses, etc.), which are made of less expensive materials suitable for use with compressed air. Consequently, it is not required to use expensive materials that are explicitly certified for use in oxygen-rich atmospheres. Gas compositions with such an oxygen content are particularly suitable for allowing a controlled oxidation or controlled reactions in the manufacturing chamber. In this way, the desired metallurgical properties of the respective metallurgical layers can be adjusted.

It is preferred to use a gas composition for the gas atmosphere and a corresponding process gas, wherein the content of flammable or explosive gases is lower than the lower limit of inflammability of the respective gas in the gas composition, particularly lower than the lower limit of inflammability of the respective gas in air. Hydrogen and/or hydrocarbons are particularly used as flammable or explosive gases.

If a comparatively low oxygen content is chosen for the gas composition or if the gas composition contains no oxygen at all, the limit of inflammability of flammable or explosive gases in the gas composition is usually higher than in air. The content of flammable or explosive gases particularly can be chosen comparatively high in such low-oxygen gas compositions. In such a low-oxygen gas atmosphere, there is no or at least hardly any risk of explosions or fires during the manufacturing process despite the increased content of flammable or explosive gases. Such a gas atmosphere particularly is completely removed from the manufacturing chamber before it is opened in order to prevent an increased risk of explosions or fires due to the admission of oxygen when the manufacturing chamber is opened.

It is furthermore preferred that the maximum content of flammable or explosive gases in the gas composition is 10% lower than the limit of inflammability of the respective gas in the gas composition or in air. This ensures that the content of these gases never exceeds the respective limit of inflammability, namely even if the content of the respective gas changes, for example, due to reactions of the gas atmosphere with the workpiece.

It is preferred to use a gas composition with a maximum carbon monoxide content of 30 ppm and/or with a maximum carbon dioxide content of 5000 ppm for the gas atmosphere. The process gas is then chosen accordingly. Such a gas composition is particularly advantageous if no safeguard is provided for preventing the manufacturing chamber from being opened before the gas atmosphere has been completely removed. In such instances, this gas composition can prevent damages to the health of a user or worker. If such a safeguard is provided, however, the respective carbon monoxide and/or carbon dioxide contents are preferably chosen higher than 30 ppm and 5000 ppm.

The invention has numerous advantages over the prior art. For example, the water vapor content and the oxygen content in the gas atmosphere can be easily and reliably controlled, adjusted and regulated. An undesirable formation of pores in the produced workpieces is prevented. The quality of the produced workpieces is thereby enhanced. Elaborate subsequent processing steps for eliminating or reducing pores are not required.

These advantages particularly manifest themselves in a powder bed process, in which the material is supplied in the form of a powder. In this case, foreign gas is typically admitted into the manufacturing chamber together with the powder and causes undefined changes in the composition of the gas atmosphere. The invention makes it possible to directly and reliably control and adjust the gas atmosphere in this respect.

It is advantageous that part of the gas is continuously extracted from the manufacturing chamber and either returned or discarded and replaced with new process gas in dependence on the comparison of the parameter with the nominal value. In this way, stable conditions can be maintained in the process chamber.

The FIGURE schematically shows a manufacturing chamber 1 for producing a workpiece by means of additive manufacturing. The finished workpiece is composed of different metallurgical layers that are individually produced in succession. The individual metallurgical layers of the work niece are respectively produced in that a metallic material is respectively provided inn each metallurgical layer and acted upon with a laser beam. This takes place under a gas atmosphere in the manufacturing chamber 1. The gas atmosphere in the manufacturing chamber 1 consists, for example, of argon that was introduced into the manufacturing chamber 1 prior to the beginning of the manufacturing process.

According to the invention, part of the gas atmosphere is extracted from the manufacturing chamber 1 in the form of a gas stream 2 and fed to an analyzer 3. One or more parameters of the gas stream 2 are determined in the analyzer 3. If the gas atmosphere consists of an inert gas as in the described example, it is frequently sensible to control the water vapor content of the gas stream 2 or the oxygen content of the gas stream 2 in order to determine if the gas atmosphere is still sufficiently inert. Otherwise, an undesirable formation of pores could take place in the interior of the workpiece.

The parameters such as, for example, the water vapor content or the oxygen content of the gas stream 2 are measured and compared with a nominal value in the analyzer 3. If the measured parameters lie below the nominal value, i.e. if the water vapor content or the oxygen content lies below the predefined nominal value, the gas stream 2 is completely returned into the manufacturing chamber 1.

However, if the water vapor content or the oxygen content is higher than the nominal value, the gas stream is partially or completely discarded. To this end, the analyzed gas stream 2 is fed to a gas control unit 4, which either returns the gas stream 2 into the manufacturing chamber 1 or discards or feeds a partial stream 5 or the entire gas stream 5 to a system in order to be used otherwise depending on the result of the comparison between the measured parameter and the nominal value.

The part of the gas stream 2, which is no longer returned into the manufacturing chamber 1, is replaced with a process gas 6. In the present example, pure argon is used as the process gas 6. The process gas is likewise fed to the gas control unit 4 (stream 7), admixed to the gas stream 2 and then introduced into the manufacturing chamber 1 (stream 8).

The FIGURE furthermore shows another circuit 9 that continuously extracts part of the gas atmosphere from the manufacturing chamber 1 and once again returns this part of the gas atmosphere into the manufacturing chamber 1. In this way, the gas atmosphere is recirculated and thereby homogenized.

What is claimed is:

1. In a method for producing a metallic workpiece in layers by additive manufacturing, wherein metallurgical layers of the metallic workpiece are produced by providing a metallic material for each of the metallurgical layers in a manufacturing chamber and acting upon the metallic material with a laser beam, and wherein a gas atmosphere is in the manufacturing chamber during the acting upon the metallurgical layers, the method comprising:

extracting a part of the gas atmosphere chosen from adjacent the metallurgical layers in the manufacturing chamber as a gas stream for obtaining at least one parameter from the part of the gas atmosphere;

comparing the at least one parameter of the part of the gas atmosphere in the gas stream with a nominal value, the comparing occurring outside the manufacturing chamber; and determining from the comparing (i) what amount of the part of the gas stream from the gas atmosphere will be returned if at all to the manufacturing chamber, and (ii) whether feeding a process gas to the manufacturing chamber will be necessary for maintaining the manufacturing chamber at a constant pressure, the determining of (i) occurring outside the manufacturing chamber and the determining of (ii) is at a controller outside the manufacturing chamber, and whether the deviation between the at least one parameter and the nominal value drops below a predefined threshold thereby requiring discharging and replacing the gas stream with the process gas having a desired composition until the deviation drops below the predefined threshold for maintaining a desired gas atmosphere in the manufacturing chamber.

2. The method according to claim 1, wherein the determining the at least one parameter of the gas atmosphere is selected from the group consisting of water vapor content, oxygen content, carbon content, and temperature of the gas atmosphere.

3. The method according to claim 1, wherein the extracting the part and the metallic material acted upon by the laser beam are at a similar height in the manufacturing chamber.

4. The method according to claim 1, wherein at least two of the metallurgical layers comprise differently defined nominal values.

5. The method according to claim 1, further comprising feeding the process gas to the manufacturing chamber if at least one of water vapor content and oxygen content of the part of the gas atmosphere are greater than the nominal value.

6. The method according to claim 1, further comprising maintaining oxygen content in the gas atmosphere at a constant value in a range of between 50 Vppm and 1000 Vppm.

7. The method according to claim 1, wherein the gas atmosphere for the metallurgical layers is a gas selected from the group consisting of a pure reactive gas, and a gas mixture with at least one reactive gas as a gas component.

8. The method according to claim 7, wherein the gas atmosphere comprises a reactive gas selected from the group consisting of hydrogen, oxygen, nitrogen, helium, carbon monoxide, carbon dioxide and hydrocarbons.

9. The method according to claim 1, wherein the metallic material comprises a low-melting metal.

10. The method according to claim 9, wherein the low-melting metal comprises a melting point selected from the group consisting of not greater than 1500° C., not greater than 1200° C., and not greater than 1000° C.

11. The method according to claim 1, wherein the metallic material comprises a powder form.

12. The method according to claim 1, wherein the amount from the determining from the comparing is selected from the group consisting of completely returning the part to the manufacturing chamber, partially returning the part to the manufacturing chamber, and not returning the part to the manufacturing chamber.

* * * * *